United States Patent [19]
Kurz

[11] 3,800,846
[45] Apr. 2, 1974

[54] FIRE DAMPER DUCT ADAPTOR
[76] Inventor: John C. Kurz, Red Lion & Gantry Rds., Philadelphia, Pa. 19115
[22] Filed: Feb. 14, 1972
[21] Appl. No.: 225,791

[52] U.S. Cl............ 160/35, 160/1, 285/369, 285/424
[51] Int. Cl............................. E04f 10/08
[58] Field of Search ......... 126/287.5; 285/424, 369; 160/1, 35

[56] References Cited
UNITED STATES PATENTS

| | | | |
|---|---|---|---|
| 3,415,543 | 12/1968 | Keating........................ | 285/424 X |
| 1,935,690 | 11/1933 | Zack............................ | 285/424 X |
| 3,246,918 | 4/1966 | Burghart...................... | 285/424 X |
| 3,552,782 | 1/1971 | O'Neal......................... | 285/424 X |
| 3,630,549 | 12/1971 | Grimm......................... | 285/424 X |

FOREIGN PATENTS OR APPLICATIONS

| 111,548 | 9/1968 | Denmark...................... | 285/424 |
|---|---|---|---|

Primary Examiner—Dave W. Arola
Attorney, Agent, or Firm—Karl L. Spivak

[57] ABSTRACT

A fire damper duct adaptor for installing a fire damper in a ventilation or air conditioning duct system which includes a duct connector of dimensions less than the fire damper frame, a peripheral filler piece joining the duct connector to the fire damper frame and a peripheral frame connection overfitting the fire damper frame and peripherally securing the filler piece thereto. The frame connection is bent to provide a peripheral U-shaped trough which overfits the end portions of the fire damper frame in a substantially air tight connection. A semi-liquid duct sealer is applied to fill the U-shaped trough to aid in sealing the junction between the duct adaptor and the fire damper frame to prevent air leakage therethrough.

5 Claims, 3 Drawing Figures 3,800,846
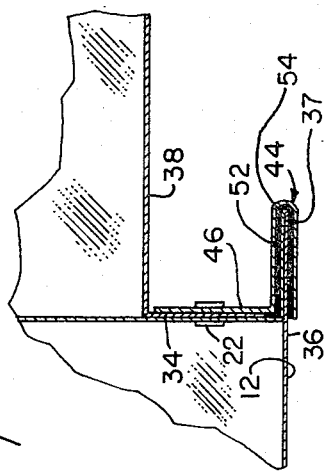
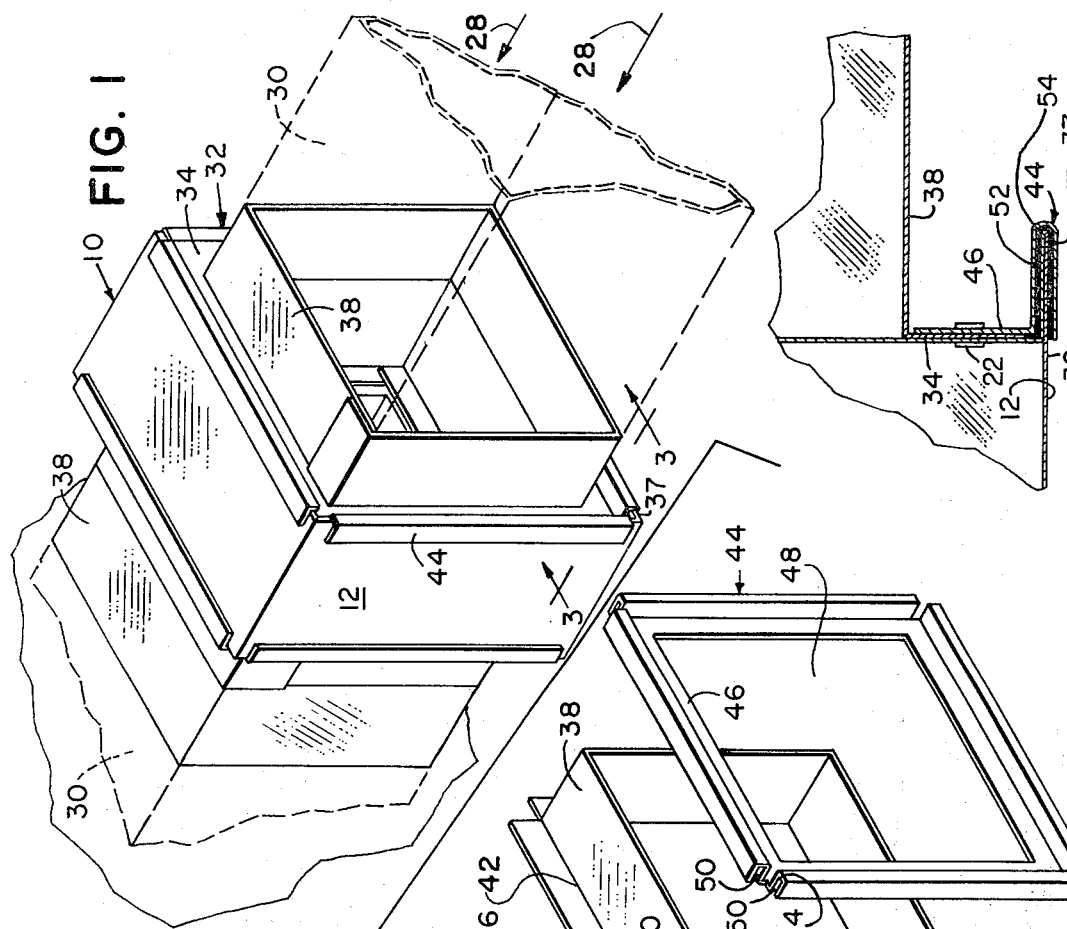
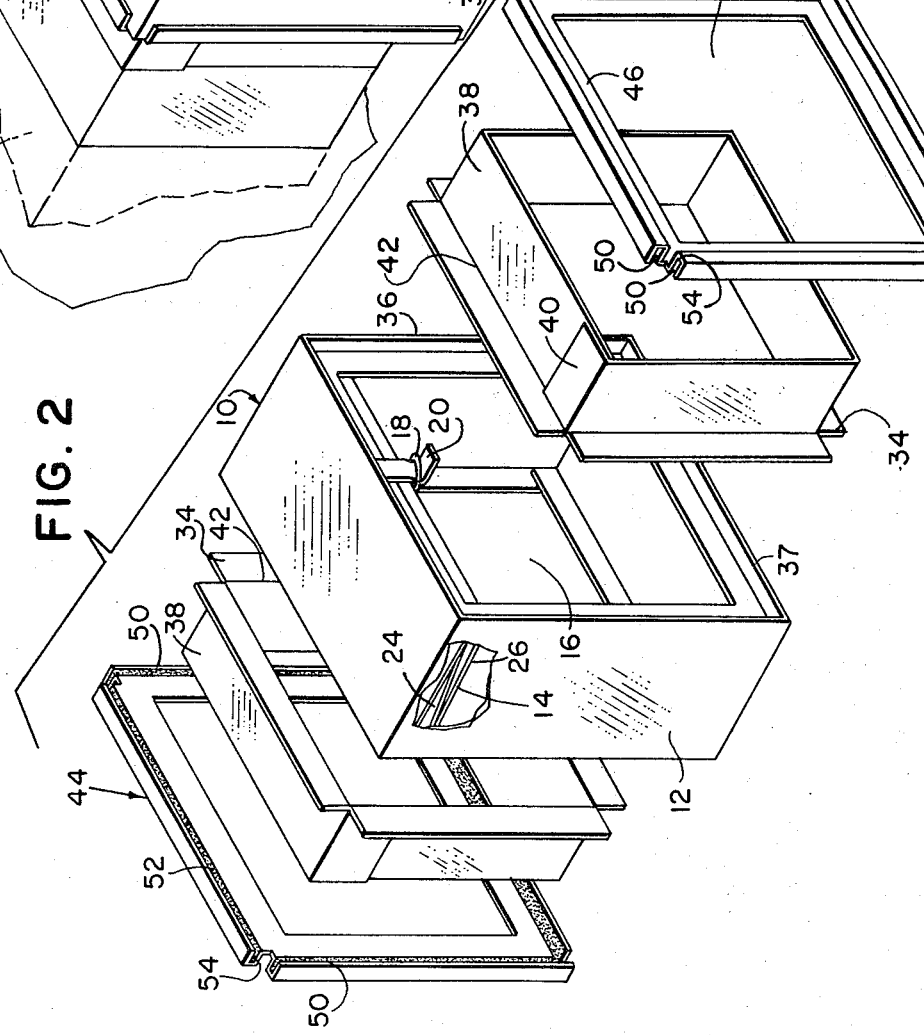

FIRE DAMPER DUCT ADAPTOR

BACKGROUND OF THE INVENTION

This invention relates generally to the field of building construction, and more particularly, is directed to a fire damper duct adaptor which is useful in connecting a fire damper to air conditioning or ventilating duct work.

Fire damper units are well known in the prior art as exemplified by my co-pending application Ser. No. 183,818, filed Sept. 27, 1971. Such prior art fire dampers include a sturdy frame assembly which defines a damper opening and which is suitable for installation in conventional heating, ventilating or air conditioning duct work. A blade assembly secures to the frame by the uppermost blade thereof and includes a plurality of pivotally interconnected blades which are movable from an open, compact position, wherein the damper opening is substantially unobstructed, to a closed position wherein the damper opening is positively closed against the passage of heated air through the duct system. The prior art fire damper units include thermally activatable retaining means which incorporate a fusible link of low temperature fuse material to maintain the blade assembly in the open position under normal thermal conditions. Upon present of predetermined abnormally high temperatures, the fusible link will melt to thereby release the blade assembly to move the blade assembly to its closed position to close the damper opening.

In newly constructed buildings wherein extensive duct systems have been designed to move conditioned air throughout the structure, it has become increasingly common practice to employ duct systems operating at increased velocity and under greater static pressures to thereby reduce the size of the duct work required. It is well known that duct size calculations are related directly to the velocity with which the air moves within the duct and the static pressures built up within the duct system by the air propelling fan. Accordingly, considerable cost savings can be realized by the expedience of increasing the velocity and static pressures of the air within the duct system to thereby decrease duct sizes and correspondingly decrease building volumetric requirements. Prior workers in the field have found that duct work must be carefully designed when employing the so called high velocity air handling systems or else annoying vibration or noise can result from the transmission of air through the duct work. In order to reduce the possibility of the generation of noise or vibration, engineers, and other duct designers have employed sound deadening devices such as felt within the duct work, have employed turning vanes at all changes in duct direction and have taken care to remove all obstructions to the flow of air within the interior of the duct system.

In the case of installation of fire dampers of the type contemplated in this application within high pressure systems, it has been common practice to mount the fire damper in the duct work by means of an adaptor which acts to position the pivotally interconnected fired damper blades exteriorly of the air stream so that there will be no impingement of the high velocity air upon the damper blades to cause unwanted noise or vibration.

The prior art duct adaptors were usually welded or otherwise securely affixed to the fire damper frame in a manner to prevent leakage of air therethrough. While such prior art duct adaptors were generally satisfactory in use, it has been found that the fabrication costs of manufacturing such equipment was extraordinarily high in relation to the cost of the fire damper itself. The high manufacturing costs could be traced directly to the skill required and the time necessary to weld the duct adaptor to the frame.

SUMMARY OF THE INVENTION

The present invention includes a fire damper of the multiple blade type wherein the blades function within a peripheral frame for the purpose of blocking the passage of fire or heat within a duct system. In accordance with the present invention, a duct adaptor has been designed for use with the peripheral frame to facilitate installation of fire dampers within high pressue duct systems in a manner to mount the blade assembly exteriorly of the duct air stream.

The duct adaptor of the present invention affixes to the periphery of a usual fire damper frame in a substantially air tight connection to prevent the leakage of air from within a high pressure air duct system therethrough. The fire damper duct adaptor includes a duct connector which axially extends from a peripheral filler piece in a substantially air tight manner. The filler piece is connected to the periphery of the fire damper frame assembly by means of a peripheral frame connection. The frame connection is bent in conventional manner by utilizing well known metal bending machinery to provide a peripheral U-shaped trough to overfit the periphery of the frame assembly. A semi-liquid duct sealant is applied to fill the U-shaped trough to aid in sealing the junction between the periphery of the frame assembly and the frame connection. The U-shaped trough overfits the periphery of the frame assembly and squeezes the duct sealant therebetween to thereby provide a substantially air tight junction without the need for welding, riveting or other costly connecting means requiring highly skilled workers.

It is therefore an object of this invention to provide an improved fire damper duct adaptor of the type set forth.

It is another object of the present invention to provide an improved fire damper duct adaptor including means to connect to the fire damper frame assembly in a substantially air tight manner without welding.

It is a further object of the present invention to provide a novel fire damper duct adaptor which includes a frame connection having a U-shaped trough and a duct sealant positioned within the trough.

It is a further object of the present invention to provide a novel fire damper duct adaptor wherein a duct connector is affixed to a frame connection by means of a filler piece and wherein the frame connection overfits the periphery of the fire damper frame assembly in a secure, leak proof connection without the requirement of welding.

It is another object of the present invention to provide a novel fire damper duct adaptor which includes elements which are designed for mass production techniques using automated equipment and which are designed for substantially air tight interconnection without the requirement for skilled mechanics.

It is another object of the present invention to provide a novel fire damper duct adaptor that is inexpensive in manufacture, simple in design and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of a fire damper equipped with a fire damper duct adaptor and installed in a horizontal duct system.

FIG. 2 is an exploded, perspective view of the fire damper and fire damper duct adaptor of FIG. 1 in accordance with the present invention.

FIG. 3 is an enlarged, partial, cross sectional view taken along line 3—3 of FIG. 1, looking in the direction of the arrows.

DESCRIPTION OF THE PREFERRED EMBODIMENTS OF THE INVENTION

Although specific terms are used in the following description for the sake of clarity, these terms are intended to refer only to the particular structure of my invention selected for illustration in the drawings, and are not intended to define or limit the scope of the invention.

Referring now to the drawings, I show in FIGS. 1 and 2 a fire damper 10 which includes a frame assembly 12 and a blade assembly 14 which may be of the interlocking blade type wherein the blades are movable in well known manner from an open position to define a clear damper opening 16, to a closed position (not shown) wherein the damper opening 16 is obstructed by the blade assembly 14 to prevent the passage of heat and other products of combustion therethrough. A fusible link 18 is carried between a pair of frame affixed arms 20 in well known manner to restrain the blade assembly 14 in the said open position during all normal periods of use. As will be seen best in FIG. 2, the arms 20 and the fusible link 18 restrain the blade assembly 14 in a tightly interfolded position 24 whereby the lowermost link 16 is secured above the air stream traveling within the duct 30 as represented by the arrows 28. In this manner, the air stream will not impinge upon the blade assembly 14 and so there will be no tendency to cause noise, vibration or other undesirable effects which may be caused by the impingement of a high velocity air stream upon an obstruction, such as fire damper blades.

The duct adaptor construction 32 incorporates a peripheral filler piece 34 which transversely inwardly extends from the outer periphery 36 of the frame assembly 12 to mount the frame 12 exteriorly of the air stream. The filler piece 34 extends a sufficient distance to define a clear opening 16 through the fire damper 10 which is equal in dimensions to the cross sectional area of the air stream carrying duct 30. The filler piece 34 must be sufficiently wide to completely shield the blade assembly 14 when in the interfolded position 24 to thereby position the blade assembly 14 outwardly from the high pressure air stream to prevent impingement of the air upon the blade assembly 14. A peripheral duct connector 38 of hollow rectangular configuration and having dimensions substantially equal to the dimesions of the duct 30 extends both upstream and downstream from the filler pieces 34 to facilitate connection of the fire damper 10 to the duct 30 in conventional manner. The duct connector 38 is conventionally formed by bending a strip of sheet steel or sheet aluminum to the desired cross sectional configuration and then joining the ends thereof in a lap joint 40 which may be retained in closed position in well known manner by suitable fastening means such as by spot welding, riveting or the like. The duct connector terminates inwardly in a bend 42 which may be integral with the outer periphery of the filler piece 34 or which may be connected in well known manner such as riveting or spot welding to provide a substantially leak proof connection. See FIGS. 2 and 3. Preferably, the filler piece 34 and the duct connector 38 are integral and are formed from the same piece of stock which is suitably bent and cut in well known manner.

In order to connect the filler piece 34 to the peripheral outer flange 37 of the frame assembly 12, a separate frame connection member is employed and is bent from a unitary piece of sheet aluminum or sheet steel. The frame connection member 44 is formed with a peripheral skirt 46 which defines an opening 48 of suitable dimensions to overfit the duct connector 38 and to overlie at least a portion of the outer periphery of the filler piece 34. The skirt 46 may be secured to the outer periphery of the filler piece 34 in well known manner such as by spot welding or riveting. The skirt 46 terminates peripherally outwardly in a trough 50 which is generally U-shaped in configuration and which extends peripherally about the frame connection member 44. As best observed in FIGS. 2 and 3, it will be noted that the U-shaped trough 50 extends from the plane of the skirt 46 in the direction of the respective associated portion of the duct 30 so as to position the filler piece 34 inwardly from the outer edge of the flange 37. The dimensions of the U-shaped trough 50 are relatively closely controlled to overfit the outer periphery of the flange 37 to provide a substantially air tight junction therewith.

In order to provide a leak proof connection between the frame connection member 44 and the outer frame flange 37, a duct sealant 52 is peripherally spread about the U-shaped trough 50 to fill the trough prior to positioning the frame connection member 44 upon the outer periphery of the frame assembly flange 37. The duct sealant 52 should be suitable to withstand the static pressures generated within high pressure duct systems, it should be fire proof and should be long lasting in leak proof manner throughout the expectant life of the fire damper 10. I have found the duct sealant manufactured by Duro-Dyne Corporation under the trade designation "S-2 Hi-Pressure Duct Sealer" to be suitable for this application.

In order to use my invention, a standard fire damper 10 which is preferably Underwriters' Laboratories, Inc., approved, it fitted on both its upstream and downstream sides with high pressure duct adaptors 32 of suitable dimensions to maintain the blade assembly 14 outwardly from a high pressure air stream as the air stream travels through a duct system 30. A duct connector 38 is secured to the fire damper frame assembly 12 through a peripheral filler piece 34 which connects to the duct connector 38 in a air tight peripheral junction. The outer periphery of the filler piece 34 is connected to the outer flange 37 of the fire damper frame assembly 12 without welding by means of a frame connection 44 which serves to connect the filler piece 34 to the frame assembly in an air tight manner.

The frame connection member 44 is provided with a planar skirt 46 which overfits and secures to the filler piece 34 in a leak proof manner. The duct sealant 52 may also be employed to seal this junction if so desired. The frame connection member 44 terminates outwardly in a peripheral U-shaped trough 50 which is bent to suitable dimensions to closely overfit the outer flange 37 of the frame assembly 12. After forming the peripheral U-shaped trough 50, the trough 50 is filled with an air resistant sealant 52. The trough 50, with the sealant fill 52 is then urged over the outer periphery of the flange 37 until the flange fully seats against the bottom 54 of the trough 50. During this assembly operation, the sealant 52 automatically flows to fill all voids between the U-shaped trough 50 and the periphery of the frame assembly 12. Excess sealant material squeezes out between the frame connection member 44 and the frame assembly 12 and this excess may be removed in any suitable, well known manner such as wiping or scraping the excess from the metallic parts. If desired, the frame connection member 44 may be additionally secured to the frame assembly 12 by applying rivets 22, sheet metal screws or similar fasteners in well known manner. It will be noted that the use of the frame connection member 44 and the duct sealt 52 completely eliminates the need for welding the duct adaptor construction 32 to the frame assembly 12 and thereby greatly decreases the assembly time required for fabricating a fire damper duct adaptor construction. Further, it will be noted that the connection between the frame connection member 44 and the frame assembly 12 is relatively simple in fabrication and accordingly, may be made by workers of relatively little experience or skill as contrasted to the degree of experience required to fabricate a complete, air tight, welded connection between the parts.

I claim:

1. In a fire damper duct adoptor suitable for installing a fire damper including a peripheral frame within an air handling duct, the combination of
   A. a duct connector of size and dimensions to outwardly connect to the said duct,
      1. said duct connector terminating inwardly in a planar filler piece,
      2. said duct connector being connected to the said filler piece in a substantially air tight peripheral junction;
   B. a frame connection member defining a central opening and overfitting the said duct connector,
      1. said frame connector including a peripheral skirt,
      2. said skirt being affixed to said filler piece in a substantially air tight peripheral junction,
      3. said frame connection member including bent fire damper frame connection means,
         a. said frame connection means extending about the entire periphery of the frame connection member,
         b. said frame connection means being bent to form a substantially U-shaped trough,
         c. the said U-shaped trough peripherally overfitting the outer periphery of the fire damper frame; and
   C. sealing means interfitting between the U-shaped trough and the outer periphery of the fire damper frame,
      1. said sealing means substantially filling the U-shaped trough,
      2. said sealing means being semi-liquid in consistency and being composed of fire resistant materials,
      3. said sealing means sealing the junction between the duct connector and the filler piece.

2. In a fire damper duct adaptor suitable for connecting the peripheral frame of a fire damper to an air handling duct in a manner to mount the blade assembly outwardly from the duct air stream, the combination of
   A. a fire damper,
      1. said fire damper including a peripheral frame and a blade assembly operable within the frame,
      2. said blade assembly being normally retained in a compacted condition wherein the blade assembly is held near the peripheral frame and wherein the blade assembly extends inwardly from the frame;
   B. a duct adaptor of size and dimensions to outwardly connect to the duct,
      1. said duct adaptor including a duct connector which amounts upon the air handling duct, the duct connector terminating in a peripheral filler piece,
         a. said filler piece peripherally extending from the duct connector to the fire damper frame,
      2. said filler piece being bent to lie in a plane positioned at right angles to the direction of air stream movement within the duct,
      3. said filler piece extending peripherally outwardly from the duct connector a sufficient distance to equal the distance the blade assembly extends inwardly from the frame to prevent impingement by the air stream upon the blade assembly;
   C. a frame connection member defining a central opening and overfitting the duct connector,
      1. said frame connection member including a peripheral skirt,
      2. said skirt terminating outwardly in a peripheral, U-shaped trough,
      3. said U-shaped trough being substantially filled with air resistant sealing means to prevent air leakage,
      4. said U-shaped trough peripherally overfitting the outer periphery of the fire damper frame and squeezing the sealing means therebetween,
         a. said sealing means sealing all voids between the periphery of the frame and the trough to prevent air leakage therethrough,
      5. the skirt of the frame connection member overlying the filler piece of the duct adaptor in a substantially air tight, peripheral connection.

3. The invention of claim 2 wherein the said filler piece is integral with the duct connector.

4. The invention of claim 3 wherein the sealing means helps seal the peripheral connection between the skirt and the filler piece.

5. The invention of claim 4 wherein the U-shaped trough extends from the plane of the skirt in the direction of the associated portion of the duct a distance sufficient to position the filler piece interiorly of the fire damper frame.

* * * * *